United States Patent [19]

Winkler

[11] Patent Number: 5,083,461

[45] Date of Patent: Jan. 28, 1992

[54] LOW FRICTION TRUNNION BEARING AND HIGH PRESSURE SEAL

[75] Inventor: Richard J. Winkler, Marshalltown, Iowa

[73] Assignee: Fisher Controls International, Inc., Clayton, Mo.

[21] Appl. No.: 491,042

[22] Filed: Mar. 8, 1990

[51] Int. Cl.$^5$ ............................................. G01F 23/32
[52] U.S. Cl. ...................................... 73/317; 277/30; 340/625; 384/2
[58] Field of Search ............ 73/317; 116/229; 137/434; 200/84 R, 84 A, 84 B, 84 C; 340/625; 277/30, 173, 212 C, 212 F; 384/2, 3

[56] References Cited

U.S. PATENT DOCUMENTS

| | | | |
|---|---|---|---|
| 1,992,212 | 2/1935 | Horne | 200/84 R |
| 2,137,880 | 11/1938 | Loesser | 137/434 |
| 2,244,131 | 6/1941 | Van Norstrand | 200/84 R |
| 2,646,067 | 7/1953 | Smith | 137/434 |
| 2,826,919 | 3/1958 | Klingler | 200/84 R |
| 3,064,095 | 11/1962 | Kmiecik et al. | 200/84 R |
| 3,890,478 | 6/1975 | Riddel | 200/84 R |
| 4,181,021 | 1/1980 | Harris et al. | 73/317 |
| 4,700,738 | 10/1987 | Frese et al. | 137/412 |
| 4,838,303 | 6/1989 | Goans | 137/423 |

OTHER PUBLICATIONS

Bulletin by Kimray, Inc., PFS Float Operated Pilot, Oklahoma City, Oklahoma—Dated 6/86.

Primary Examiner—William A. Cuchlinski, Jr.
Assistant Examiner—W. Morris Worth
Attorney, Agent, or Firm—Dale A. Kubly; Nicholas A. Camasto; Arnold H. Cole

[57] ABSTRACT

A high pressure, fluid level sensor and seal includes a body supporting a removable end cap and housing a trunnion bearing comprising a pivot disk that is pivotable about a pivot axis formed by a pair of pivot pins that are secured to the base of the end cap. The pivot disk is connected to a control arm that freely passes through the end cap. The pivot disk is also connected to a displacer arm that engages a float or displacer in communication with fluid in a high pressure tank. A compression spring acting between the control arm and the end cap biases the pivot disk against the pivot pins. The control arm engages an operating mechanism in a controller that includes a relay. The body is secured in the wall of a high pressure tank. A high pressure seal is formed by a spacer that forms a slip fit with an annular recess on the pivot disk and which engages the end cap and O-rings. The O-rings couple the spacer to the pivot disk and couple the spacer to the end cap. Small pivotal movement of the pivot disk about the pivot pins does not disrupt the high pressure seal. The entire assembly is readily removable from the tank for servicing without requiring removal of the body.

14 Claims, 4 Drawing Sheets

LOW FRICTION TRUNNION BEARING AND HIGH PRESSURE SEAL

BACKGROUND OF THE INVENTION AND PRIOR ART

This invention relates generally to fluid level sensing systems and particularly to systems in which the sensed fluid is in a vessel or tank under high pressure.

In general prior art systems sense changes in the level of a liquid in a tank or other container with a sensing element or float that is in communication with the liquid in the container and which transmits a force or movement to a control device that is situated outside the container. The force or displacement is a measure of the change in liquid level. For low pressure installations, the seal between the container and the means that transmit the force or motion from the sensor inside the container to the control means outside the container may be relatively simple. For example, a simple bellows would suffice. For high pressure environments, however, the type of seal is critical. In such an arrangement, pressures up to 6,000 lbs. per square inch (422 kilograms per square centimeter) may be encountered. Further, the means for relaying the force or motion should be capable of providing reliable and consistent operation in a variety of different environments. Also the friction imposed by the bearing and the seal should be minimal and uniform for different applications. In particular, the friction in the mechanism should be insensitive to the high pressure within the tank.

One prior art seal is shown in U.S. Pat. No. 4,700,738 in which motion is transmitted by a rotatable shaft. An 0-ring effects a seal between the shaft and the housing. The rotational type seal introduces a significant amount of friction and requires a breakout torque to begin operation which adversely affects the accuracy of the sensing mechanism. The amount of friction is also dependent upon the pressure applied to the seal.

The device illustrated in U.S. Pat. No. 4,838,303 transmits a rocking motion through the seal which flexes with movement of the transmitting shaft. The plane of the motion is defined by a single point fulcrum and a guiding mechanism. Significant friction is encountered when sliding occurs between the pin and the guiding mechanism. Also the seal may not be serviced without completely removing the sensor body from its mounting.

The trunnion bearing and seal of the present invention not only satisfies the above mentioned criteria, but has an important advantage of being field serviceable. The bearing and seal are easily removable to permit seal renewal or general maintenance. The trunnion bearing and high pressure seal of the invention also provides a replaceable low friction, high pressure liquid level sensor arrangement. The inventive apparatus consists of a pivot disk that is connected to a displacer arm (and sensor element) at one end and to a control arm (and controller) at the other end. A removable end cap carries a pair of pivot pins that are engageable with a pair of spherically shaped depressions in the face of the pivot disk. The control arm freely passes through an orifice in the end cap and is spring loaded (against the end cap) to maintain the pivot disk in engagement with the pivot pins. An elastomeric seal is provided between the end cap and a movable spacer and between the movable spacer and the pivot disk for permitting slight movement of the pivot disk about the pivot pins without disruption of the high pressure seal.

OBJECTS OF THE INVENTION

A principal object of the invention is to provide an improved high pressure fluid level sensor system.

Another object of the invention is to provide a novel high pressure fluid level sensor that is readily replaceable in the field.

A further object of the invention is to provide a novel low friction bearing and seal arrangement for transmitting small movements from a sensor located in a high pressure area to a controller located in a low pressure area.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
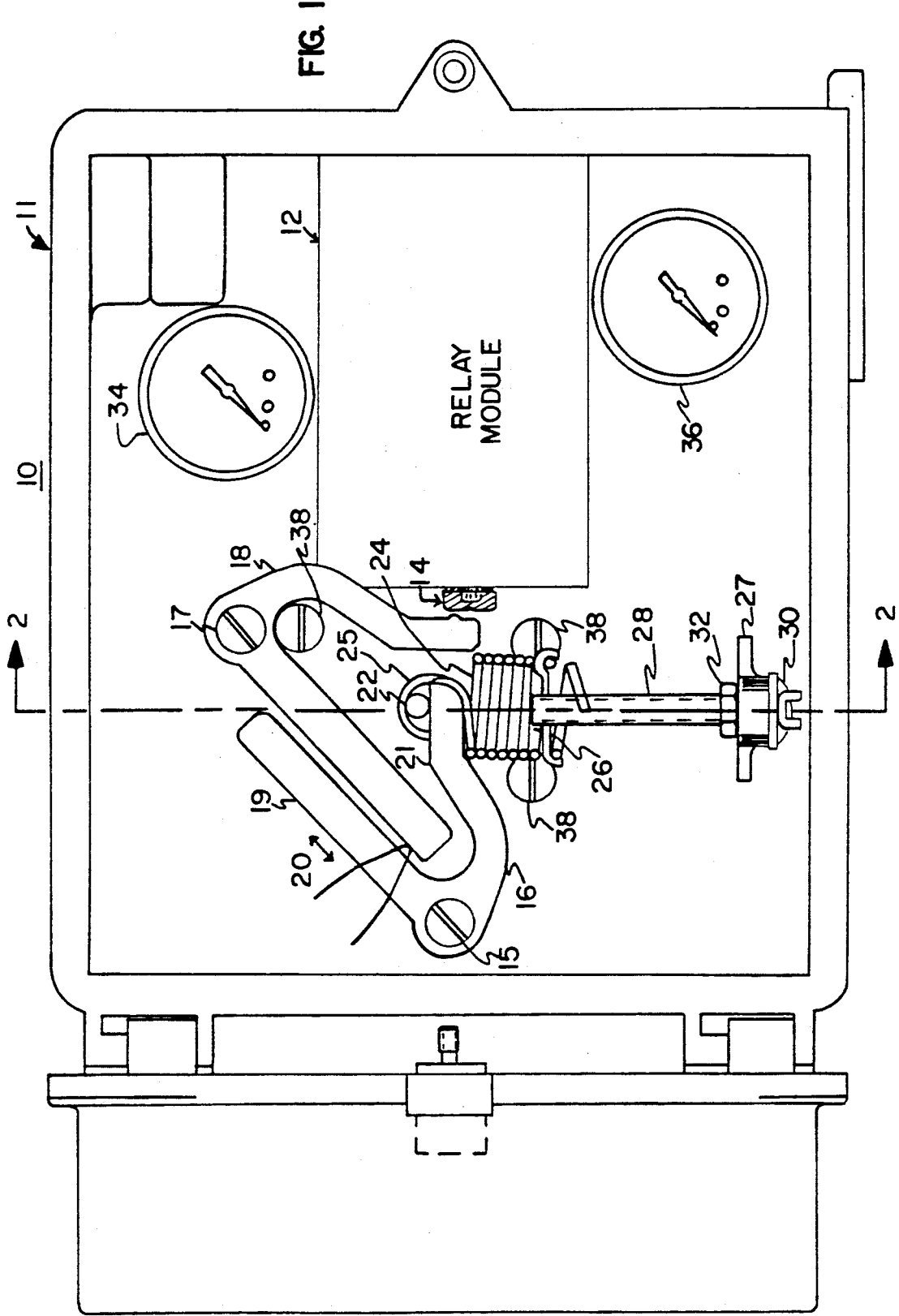
FIG. 1 shows the sensor movement-responsive elements of a controller including a relay module, as used with the preferred embodiment of the invention.

Referring to FIG. 1, a controller 10 has a base 11 and includes a relay module 12 having a motion responsive input device 14 that may comprise a pin that is actuated by means of a pair of pivotally mounted input and output levers 16 and 18. Input lever 16 has a flat portion 19 over which a spring clip type fulcrum 20 is movably mounted. An end 21 of input lever 16 is formed to engage the end of a control arm 22. As will be seen, control arm 22 is coupled to a sensing mechanism for determining the level of a liquid in a tank. Input lever 16 is pivotally mounted to base 11 by means of a pivot 15 and output lever 18 is similarly pivotally mounted by means of a pivot pin 17. By moving the spring clip fulcrum 20 along flat portion 19, the force application point between input lever 16 and output lever 18 may be changed. Consequently the amount of movement of output lever 18 in response to movement of input lever 16 may be varied.

A zero adjustment mechanism comprises a coil spring 24 having a hooked end 25 engaging a groove or bend in the end of control arm 22. The other end of spring 24 engages a seating plate 26 that includes a threaded aperture. A bolt 28 is screwed into the threaded aperture in seating plate 26 and extends through a support post 27 which is integral with the base 11 of controller 10. A wing nut 30 is provided for adjusting the force exerted by spring 24 and a lock nut 32 secures the adjustment position. A pair of gauges 34 and 36 provide suitable information to the operator and four mounting bolts 38 secure the controller base 11 to an end cap of the trunnion body, as will be seen with reference to FIG. 2.

Figure 2:
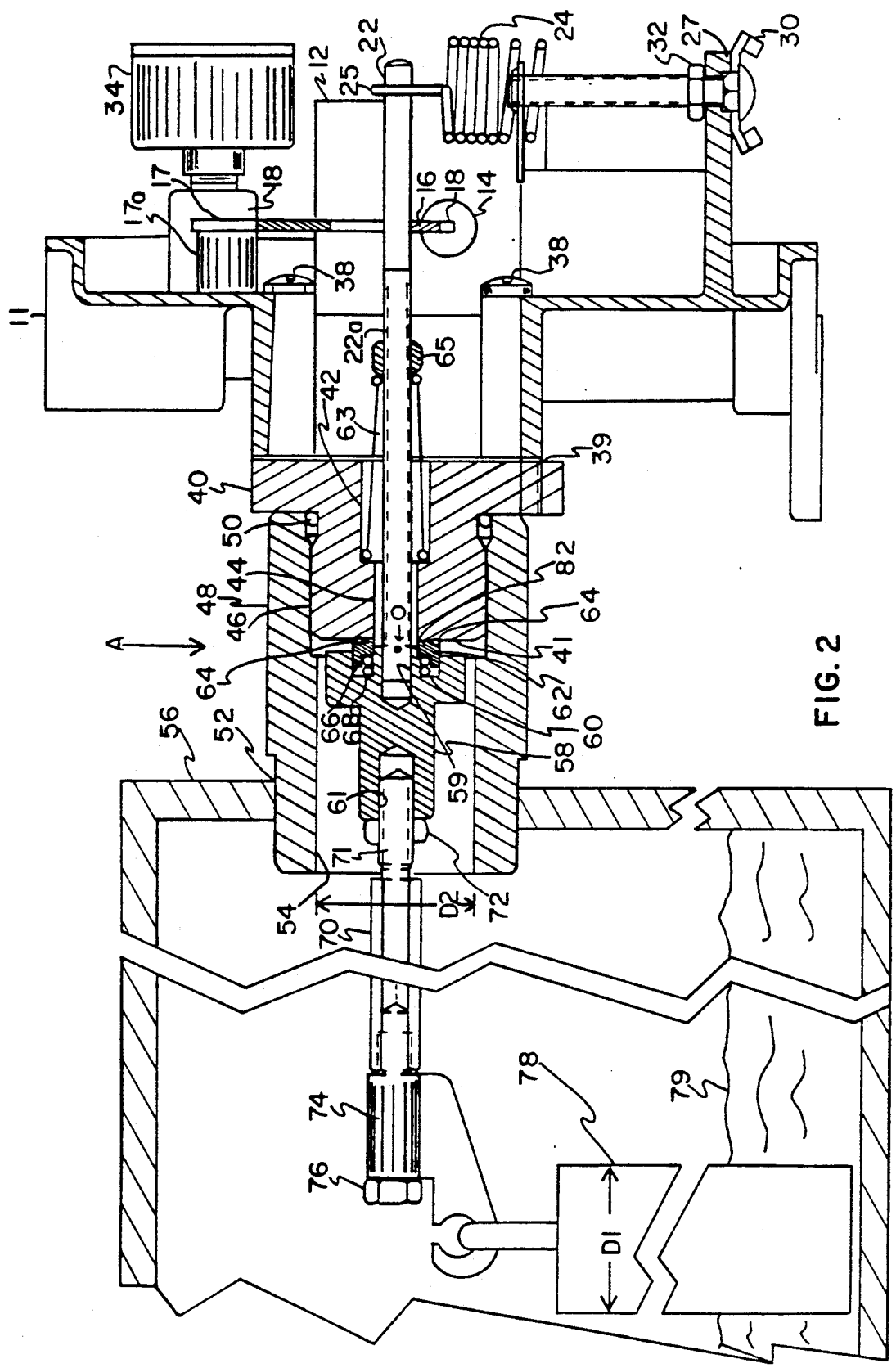
FIG. 2 is a partial section taken along the line 2—2 of FIG. 1 showing the trunnion bearing and seal of the invention in a high pressure liquid level sensor environment.

FIG. 2 discloses a side sectional view through the trunnion body, bearing and seal of the invention, the controller body and portions of the sensing mechanism and high pressure tank. A removable end cap 40 is secured in sealing relationship to base 11 of controller 10 by a suitable gasket 39 and mounting bolts 38 which engage corresponding threaded apertures (visible in FIG. 5) in end cap 40. The end cap 40 has a generally T shaped cross section and includes an external threaded portion 46 for threaded engagement with a similar internal threaded portion on trunnion body 48. A first cylindrical recess 42 opens into a second, smaller cylindrical passageway 44 in end cap 40. Control arm 22 has a long threaded portion 22a which freely passes through cylindrical recess 42 and passageway 44. Body 48 is also generally cylindrical and includes an annular bore 54 of a diameter D2 that, as mentioned, has a complementarily threaded portion at one end for engaging threaded portion 46 of end cap 40. An 0-ring 50 provides a seal between body 48 and end cap 40. The other end of body 48 has an external threaded portion 52 that engages a suitable orifice in a high pressure tank 56, depicted in broken configuration to show the relevant sensor elements.

A pivot disk element 58 of stepped cylindrical configuration includes a centrally disposed, threaded blind hole 59 in which the end of threaded portion 22a of control arm 22 is secured to rigidly attach pivot disk 58 to control arm 22. The other end of pivot disk 58 includes another threaded blind hole 61. An annular recess 60 is formed in the large face of pivot disk 58 and is adapted to receive a ring-shaped spacer 62 having a stepped cross section. As will be seen in more detail with reference to FIG. 4, a raised cylindrical collar 82 is situated in the center of pivot disk 58 and forms an inner (smaller diameter) wall of annular recess 60, the outer (larger diameter) wall of recess 60 being parallel thereto. Spacer 62 engages collar 82 and the outer wall of annular recess 60 in a slip fit and is therefore axially movable with respect to these parallel walls. One end of spacer 62 is adapted to engage a seal surface 41 formed on the bottom of end cap 40. An 0-ring 64 seals the end of spacer 62 and the seal surface 41 on end cap 40 and a pair of 0-rings 66 and 68 seal the spacer 62 to the pivot disk 58. A compression spring 63 is seated in the bottom of cylindrical recess 42 in end cap 40 and affixed to control rod 22 by means of an adjustment nut 65 that is movable along threaded portion 22a. Compression spring 63 forces pivot disk 58 toward end cap 40. As best seen by reference to FIG. 9, a pair of pivot pins limit the travel of pivot disk 58 and are loaded by the action of spring 63.

A displacer arm 70 includes a threaded end 71 which engages the threaded blind hole 61 of pivot disk 58 and is secured in the desired position by means of a lock nut 72. The other end of displacer arm 70 is coupled to a support 74 that is secured to the other end of displacer arm 70 by a suitable nut 76. Support 74 is rotationally movable on displacer arm 70, however. A displacer or float element 78, preferably cylindrical in shape and of a diameter D1 that is smaller than diameter D2 in body 48, is partially immersed in a fluid such as a liquid 79 and supported by support 74. As will be seen, vertical movement of element 78 in response to changes in buoyant force exerted thereon responsive to changes in the level of liquid 79 cause displacer arm 70 to move vertically. This results in an upward (or downward) movement of pivot disk 58. Pivot disk 58 engages the pair of pivot pins and is restricted to pivotal movement about a pivot axis defined by a line perpendicular to the drawing and passing through point "0". Movement of pivot disk 58 about this pivot axis causes a proportional opposite movement of control arm 22. The provision of a cylindrical displacer element 78, of smaller diameter than the diameter D2 of body 48, enables removal of the displacer element through the body 48.

Figure 3:
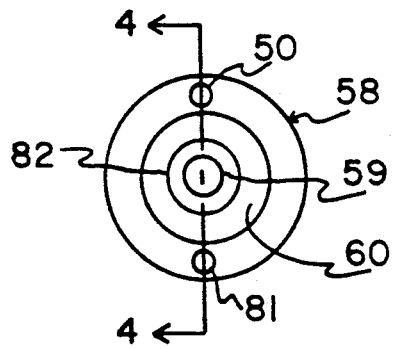
FIG. 3 is an end view of the pivot disk of the invention.
Figure 4:
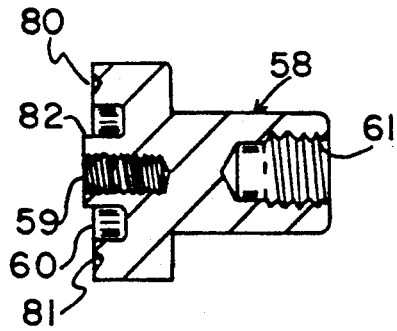
FIG. 4 is a sectional view taken along the line 4—4 of FIG. 3.

FIGS. 3–8 show plan and sectional views of pivot disk 58, end cap 40 and body 48. With particular reference to FIGS. 3 and 4, pivot disk 58 includes centrally disposed cylindrical collar 82 that extends beyond the surface in which annular recess 60 is formed. A pair of spherical or cup-shaped depressions 80 and 81 are formed in the outer face of pivot disk 58 for cooperation with the pair of pivot pins as will be described.

Figure 5:
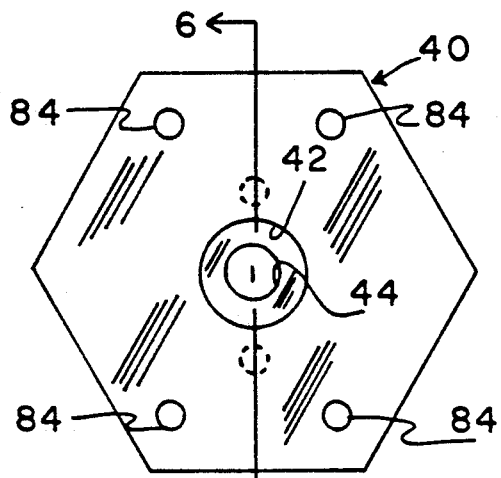
FIG. 5 is an end view of the end cap of the trunnion.
Figure 6:
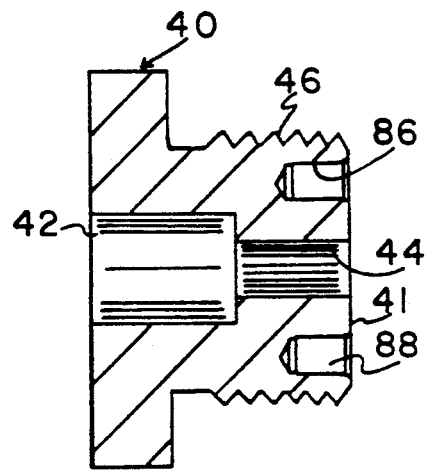
FIG. 6 is a sectional view taken along the line 6—6 of FIG. 5.

In FIGS. 5 and 6, end cap 40 has an outer configuration that is adapted to be engaged by a wrench or the like for screwing end cap 40 into and out of body 48. Four threaded holes 84 are formed in the large face of end cap 40 for enabling corresponding bolts 38 to secure the controller base 11 to end cap 40. The smaller end of end cap 40 includes seal surface 41 and a pair of blind holes 86 and 88 in which the pivot pins are secured.

Figure 7:
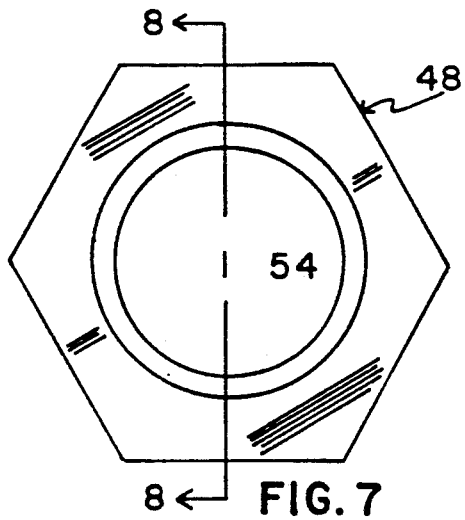
FIG. 7 is an end view of the body that houses the trunnion bearing.
Figure 8:
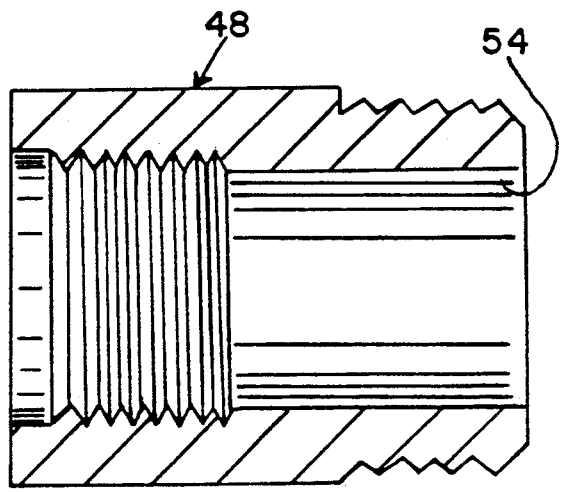
FIG. 8 is a sectional view taken along the line 8—8 of FIG. 7.

FIGS. 7 and 8 show the cylindrical body 48. Body 48 also has an exterior that is engageable by a wrench for facilitating installation of the body in a suitably threaded orifice in a high pressure tank.

Figure 9:
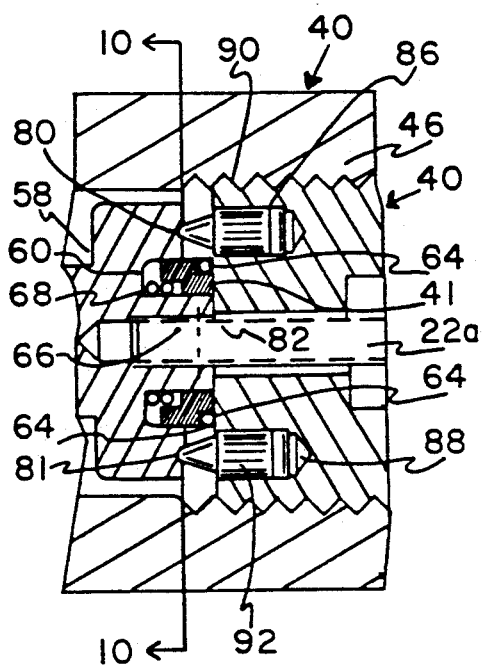
FIG. 9 is a partial view in the direction indicated by the arrow A in FIG. 2 showing the pivot pin arrangement.
Figure 10:
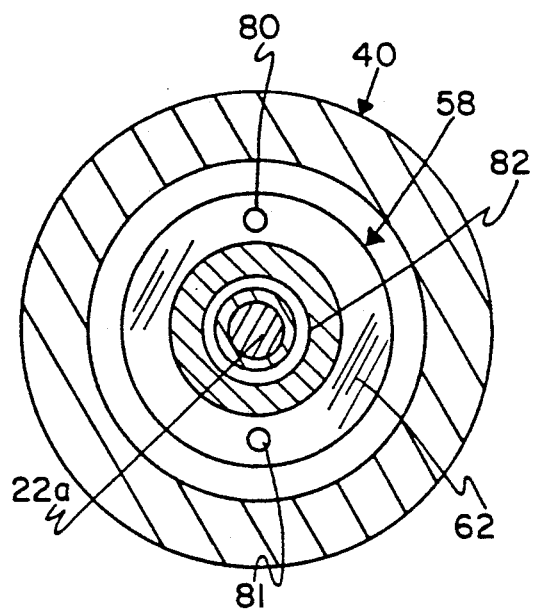
FIG. 10 is a sectional view taken along the line 10—10 of FIG. 9.
Figure 11:
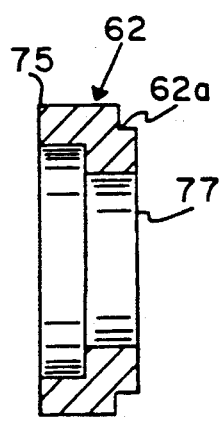
FIG. 11 is a sectional view of the spacer used in the seal of the invention.
Figure 12:
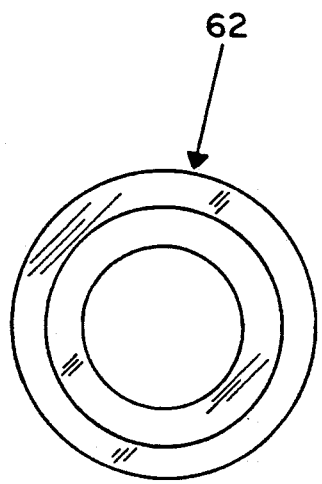
FIG. 12 is an end view of the spacer of FIG. 11.
Figure 13:
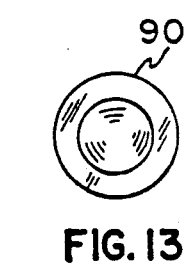
FIGS. 13 and 14 are end and side views, respectively, of a pivot pin used in the invention.
Figure 14:
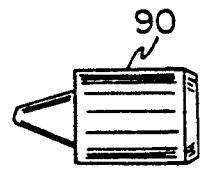

FIG. 9 is a sectional view of the trunnion and seal arrangement of FIG. 2 viewed in the direction of arrow A. In this view, a pair of pivot pins 90 and 92 are clearly shown with their points engaging depressions 80 and 81, respectively. Pivot pins 90 and 92 are secured in recesses 86 and 88, respectively, that are formed in the bottom of end cap 40. Annular spacer 62, as best shown in FIG. 11, has a generally stepped cross section and has an outer wall 75 that forms a slip fit with the larger diameter wall of annular recess 60 in pivot disk 58. Its inner wall 77 also forms a slip fit with collar 82 of pivot disk 58. Consequently, spacer 62 is free to move into and out of annular recess 60. The pair of 0-rings 66 and 68 seal spacer 62 to pivot disk 58 and the 0-ring 64 seals spacer 62 to seal surface 41 on end cap 40.

In operation, the adjustment spring 24 is adjusted by means of wing nut 30 to zero the control arm displacement for the particular sensor installation. Thereafter, changes in buoyant force applied to element 78 are reflected in vertical displacement of displacer arm 70 which causes pivot disk 58 to pivot about the pivot axis "0" defined by the points of the pivot pins 90 and 92. The small movement is accommodated by spacer 62 being axially displaced along collar 82 and the outer wall of the annular recess 60 against the urging of the resilient 0-rings 64, 66 and 68. The design enables a very high pressure seal to be maintained through the trunnion bearing. The trunnion bearing and seal arrangement exhibits extremely low friction which is not substantially affected by the pressure encountered from the high pressure tank. The body 48, end cap 40, pivot disk 58 and spacer 62 are all fabricated of metal, the only elastomeric materials being the O-rings 64, 66 and 68.

An important feature of the invention is easy servicability. Body 48 is secured to high pressure tank 56 and need not be removed, nor the sensor components in the tank removed in the event that maintenance or replacement of the seals is required. Servicing is accomplished by removing the four retaining bolts 38 holding body 11 to end cap 40. End cap 40 may simply be unscrewed to remove it from body 48 without disengaging the pivot disk 58 from pivot pins 90 and 92 because displacer arm 70 is rotatable in support 74. Indeed, because of the relationship of the diameter D1 of element 78 and the diameter D2 of body 48, the entire assembly (end cap 40, O-rings, spacer 62, pivot disk 58, displacer arm 70, element 78, control arm 22 and spring 63) may be removed as a unit for servicing. Alternatively, pivot disk 58 may be "unloaded" by forcing control arm 22 to the left, either by physically pushing on the arm or by releasing the force exerted by spring 63 by turning adjusting nut 65 along threaded portion 22a of the control arm, to permit removal of end cap 40. (Forcing the pivot disk 58 to the left disengages the pivot disk 58 from pivot pins 90 and 92 and permits end cap 40 to be unscrewed from body 48.) Thereafter pivot disk 58, which is attached to control arm 22, may be withdrawn to permit servicing of the seals and/or adjustment of the length of displacer arm 70. This may be accomplished without removal of the sensor components or body from the high pressure tank.

What has been described is a novel low friction, high pressure trunnion bearing and seal. It is recognized that numerous changes in the described embodiment of the invention will be apparent to those skilled in the art without departing from its true spirit and scope. The invention is to be limited only as defined in the claims.

What is claimed is:

1. A sensor system comprising:
   a high pressure tank;
   sensor means in said high pressure tank for converting a sensed change in the level of the contents of said high pressure tank into a movement;
   arm means, coupled to said sensor means at one end and passing into said high pressure tank, for translating movements of said sensor means;
   relay means, coupled to said arm means at the other end, for responding to movement of said arm means;
   trunnion means, supported in said high pressure tank and coupled to said arm means for permitting movement of said arm means while maintaining pressure in said high pressure tank, said trunnion means having a low friction bearing and including high pressure seal means, said low friction bearing comprising a pivot disk, a pair of pivot pins defining a pivot axis spaced from a seal surface and means secured to said arm means for biasing said pivot disk against said pivot pins, said arm means passing through said trunnion means and being coupled to said pivot disk; and
   said high pressure seal means comprising spacer means, including a plurality of elastomeric seals, for sealing said pivot disk to said seal surface for slight pivotal movement of said pivot disk about said pivot axis.

2. The system of claim 1 wherein said trunnion means further includes a removable end cap defining said seal surface and supporting said pivot pins, said removable end cap having an orifice through which said arm means freely passes.

3. A high pressure fluid level sensor system comprising:
   a high pressure tank;
   sensor means in said high pressure tank movable in response to buoyant forces exerted by the contents of said high pressure tank;
   an arm means, coupled to said sensor means and extending outside said high pressure tank, for translating movement of said sensor means outside said high pressure tank;
   a cylindrical body member mounted in said high pressure tank;
   a removable end cap secured to said body member and defining an orifice and a seal surface;
   a pivot disk supported by said arm means, said arm means passing through said body member and through said orifice in said end cap; and
   a trunnion bearing between said pivot disk and said seal surface, said trunnion bearing including a pair of pivot pins, defining a pivot axis orthogonal to the direction of movement of said sensor means, and seal means for sealing said pivot disk to said seal surface.

4. The system of claim 3 wherein said pivot pins are supported in said end cap about said seal surface, and further including spring means for urging said pivot disk into engagement with said pivot pins.

5. The system of claim 4 wherein said pivot disk includes a centrally disposed collar and a pair of depressions for engaging said pivot pins, and wherein said seal means includes an annular spaced slidably engaging said collar and a plurality of elastomeric seals for engaging said pivot disk, said spacer and said seal surface.

6. The system of claim 5 wherein said elastomeric seals comprise O-rings.

7. The system of claim 6 wherein said pivot disk includes an annular recess located between said collar and said depressions, and wherein said annular spacer and said annular recess are engaged in a slip fit.

8. The system of claim 7, wherein said spring means comprise a compression spring coupled between said arm means and said end cap.

9. The system of claim 8 wherein said sensor means is configured to pass freely through said cylindrical body when said end cap is removed.

10. A readily replaceable, low friction, high pressure, trunnion bearing and seal arrangement comprising:
    a cylindrical body;
    a removable end cap in said body and defining an orifice;
    a pair of pivot pins supported in said end cap and defining a pivot axis;
    a pivot disk pivotally engaging said pivot pins;
    arm means, secured to said pivot disk and freely passing through said orifice in said end cap for translating movement of said pivot disk outside said cylindrical body;
    axially movable spacer means coupling said pivot disk and said end cap for sealing said pivot disk and said end cap;

spring means for urging said pivot disk into engagement with said pivot pins; and said spacer means including resilient seals coupling said spacer means and said end cap, and coupling said spacer means an said pivot disk to permit slight movement of said arm means about said pivot axis without disrupting said seals.

11. The arrangement of claim 11 wherein said pivot disk includes a cylindrical collar surrounded by an annular recess and defining concentric, parallel walls, and wherein said spacer means is an annular ring having outer and inner parallel surfaces engaging said wall of said annular recess and said cylindrical collar, respectively.

12. The arrangement of claim 11 wherein said pivot disk has an annular surface adjacent to said annular recess and a pair of depressions in said annular surface for engaging said pivot pins.

13. The arrangement of claim 12, wherein said resilient seals comprise 0-ring elastomeric seals between said annular spacer and said cylindrical collar and between said spacer and said end cap.

14. The arrangement of claim 13 wherein said spring means comprises a compression spring coupled between said arm means and said end cap.

* * * * *

UNITED STATES PATENT AND TRADEMARK OFFICE
CERTIFICATE OF CORRECTION

PATENT NO. : 5,083,461
DATED : January 28, 1992
INVENTOR(S) : Richard J. Winkler It is certified that error appears in the above-identified patent and that said Letters Patent is hereby corrected as shown below:

Column 6, line 39, delete "spaced", insert --spacer--;

Column 7, line 5, delete "an", insert --and--;

Column 7, line 8, delete "claim 11", insert --claim 10--.

Signed and Sealed this

Fifteenth Day of June, 1993

Attest:

MICHAEL K. KIRK

*Attesting Officer*      *Acting Commissioner of Patents and Trademarks*